June 15, 1965  C. L. MOORE ETAL  3,189,675
ELECTRICAL APPARATUS

Filed Aug. 17, 1962  2 Sheets-Sheet 1

WITNESSES

INVENTORS
Curtis L. Moore &
Theodore R. Specht
BY
ATTORNEY

June 15, 1965

C. L. MOORE ETAL 3,189,675

ELECTRICAL APPARATUS

Filed Aug. 17, 1962

United States Patent Office 3,189,675
Patented June 15, 1965

3,189,675
ELECTRICAL APPARATUS
Curtis L. Moore, Hickory Township, Mercer County, and Theodore R. Specht, Sharon, Pa., assignors to Westinghouse Electric Corporation, East Pittsburgh, Pa., a corporation of Pennsylvania
Filed Aug. 17, 1962, Ser. No. 217,583
4 Claims. (Cl. 174—11)

This invention relates in general to pressure relief apparatus and more particularly to means for relieving sealed electrical apparatus of excessive internal pressure.

Pressure relief devices of the prior art have conventionally employed such means as glass diaphragms or self-reclosing mechanically operated relief mechanisms.

The former method is not without some danger and lacks a self-resetting action; the latter method presents the problem of obtaining sufficient gasket pressure without making the relieving pressure too high.

Accordingly, it is the general object of this invention to provide a new and improved pressure relief device for electrical apparatus.

It is a more particular object of this invention to provide a new and improved pressure relief device that is self-resetting and simple and reliable in operation.

It is still another object to provide a pressure relief device which is held closed primarily by magnetic means until the pressure protected against reaches a predetermined value.

Briefly, the present invention accomplishes the above-cited objects by providing a self-reclosing pressure relief device in which a plurality of permanent magnets are used to provide the latching or holding of the mechanism in a closed position. More specifically, permanent magnets are arranged about an opening in the apparatus to be protected. Pole pieces are used to concentrate the magnetic flux. The permanent magnets exert a pull on an armature which is associated with a sealing member. The sealing member cooperates with a sealing gasket. Springs and guiding means are provided to control the motion of the armature and a means of adjustment is included to allow setting the desired pressure between the sealing member and the gasket.

Further objects and adavntages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
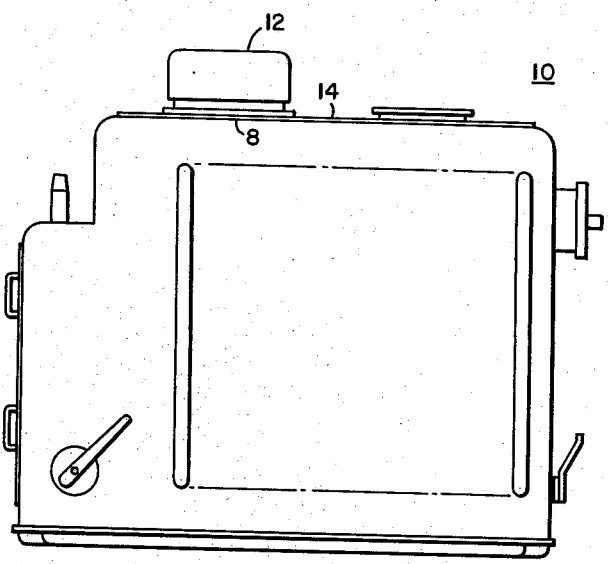
FIGURE 1 shows a side elevation of a sealed electrical enclosure with the magnetic relief device on top.

Referring to FIGURE 1, there is shown a sealed electrical enclosure 10. This enclosure contains electrical coils and a magnetic core which when energized produce heat. A fault or an extreme overload can cause a rapid increase in this heat resulting in a corresponding increase in the internal pressure of enclosure 10. It is desirable to safeguard the enclosure 10 from rupture by limiting the internal pressure of the enclosure 10 to a safe level. The enclosure 10 is provided with a top 14 having an opening 8. A magnetic pressure relief device 12 is mounted over the opening 8 to prevent the internal pressure of the enclosure 10 from exceeding a predetermined value. Any excess pressure in enclosure 10 will be vented to the outside atmosphere by means of magnetic relief device 12.

Figure 2:
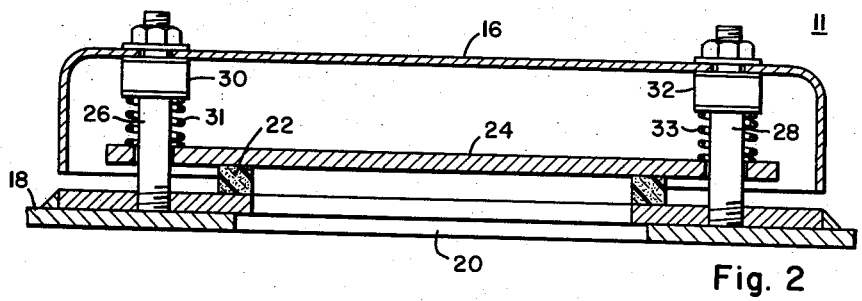
FIG. 2 is a transverse sectional view of an embodiment of the invention utilizing a permanently magnetic gasket.

An embodiment of the invention 11 utilizing a magnetic gasket 22 is illustrated in FIG. 2. The top 18 of a sealed enclosure is provided with an aperture 20. Over the aperture a ferromagnetic closure 24 is positioned by a guide means such as studs 26 and 28. A permanently magnetic gasket 22 composed of a material such as barium ferrite dispersed in a plastic or rubber is fastened about the aperture 20. Springs such as 31 and 33 are placed over the studs 26 and 28. Resilient bumpers 30 and 32 are mounted on the studs 26 and 28, as is a weather cover 16.

The internal pressure of the enclosure to be protected exerts a force against the ferromagnetic closure member 24 through aperture 20. This force is resisted by the pull of the permanent magnet gasket 22 against the ferromagnetic closure 24 and to a lesser degree by the force exerted by the springs such as 31 and 33 against the closure member 24. When a predetermined internal pressure is reached in the device being protected, the closure member 24 is forced upward along the studs such as 26 and 28. In the event of a rapid opening, the resilient bumpers such as 30 and 32 take up the shock caused by the quickly lifting closure member 24.

Figure 3:
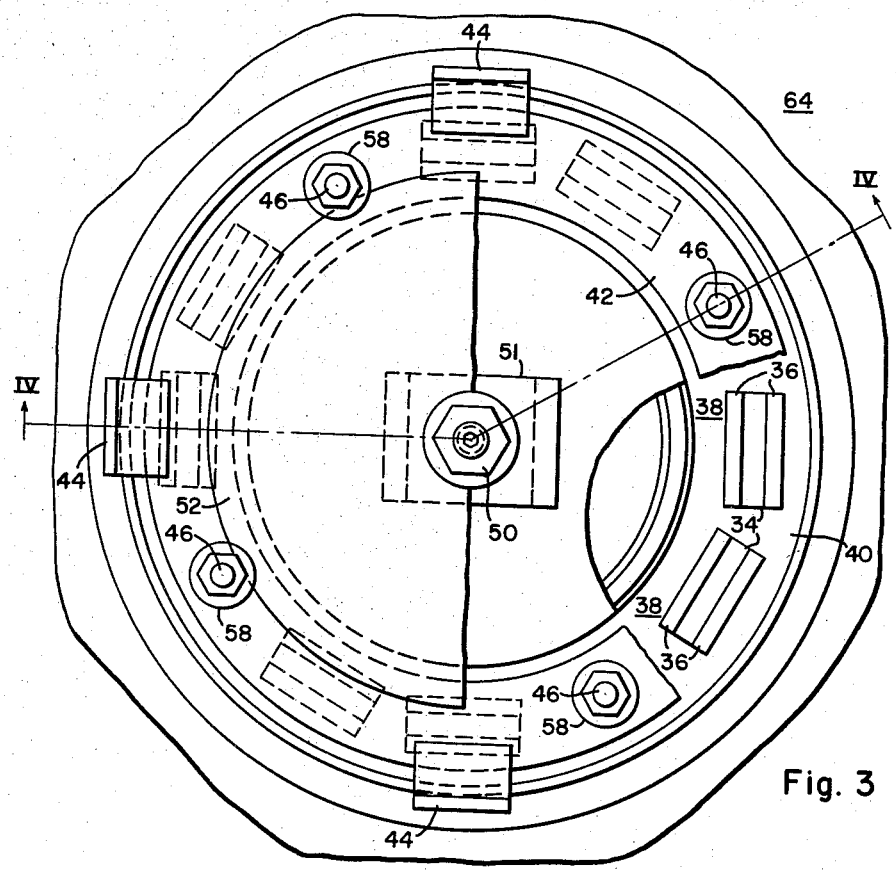
FIG. 3 shows a top plan view of the preferred embodiment of the invention with a weather cover removed and parts broken away.

In FIG. 3 is illustrated the preferred embodiment of the invention 64 in which permanent magnets 34 and ferromagnetic pole pieces 36 are used. The permanent magnets 34 are associated with the pole pieces 36 in assemblies 38. The permanent magnet-pole piece assemblies 38 may be embedded in a potting compound 40. A ferromagnetic armature 42 is employed to function with permanent magnet-pole piece assemblies, such as 38. Brackets 44 are attached to armature ring 42 to permit installation of a weather cover which will be described in detail later. Guide pins 46 are inserted through the armature 42. Resilient bumpers 58 are attached to the free ends of the guide pins. A closure member 48 is attached to armature 42 by means of structural members 51 and 52.

Figure 4:
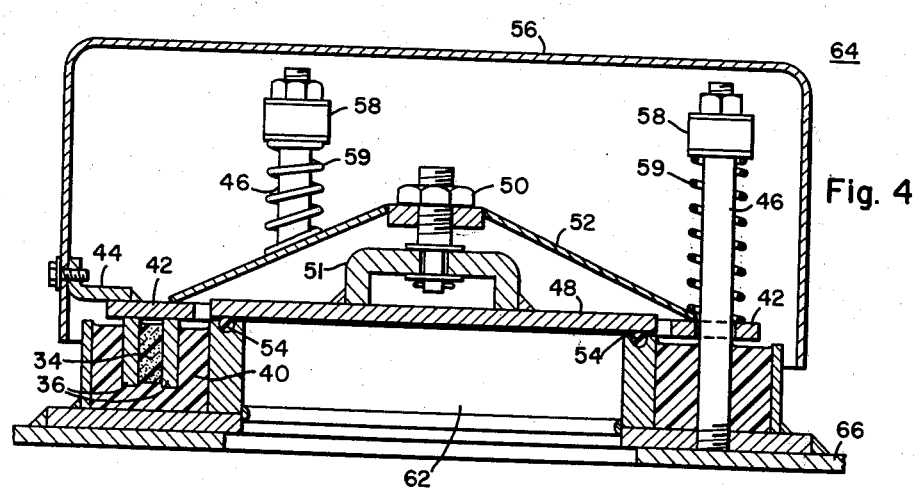
FIG. 4 is a cross section of the magnetic relief device of FIG. 3 taken along the plane IV—IV.

Referring to FIG. 4, another view of the embodiment of the invention illustrated in FIG. 3 is shown. Springs 59 are placed over the guide pins 46 and are held in compression between bumpers 58 and armature 42. An adjustment nut 50 is provided to vary the air gap between the armature 42 and the permanent magnet-pole piece assemblies such as 38. An aperture 62 is provided in the sealed enclosure 66 to be protected. The magnetic relief device 64 is mounted over the aperture 62. An O-ring 54 is cemented about the rim or valve seat of the aperture 62. The O-ring acts as a seal or gasket between the aperture 62 and the closure member 48. A weather cover 56 is attached to the armature 42 by means of brackets such as 44. The weather cover excludes foreign matter from the relief device 64 and the enclosure 66 being protected.

The internal pressure of the sealed enclosure being protected by the relief device 64 will exert a force against the closure member 48. If this pressure is sufficient, the closure member 48 will be forced upward. The holding force of the magnets such as 34 and the springs 59 will be overcome and the armature ring 42, and everything attached to it will travel along the guide pins 46. The internal pressure will now be vented to the atmosphere through aperture 62. The pressure of the closure 48 against the O-ring 54 may be decreased by increasing the spacing between the armature 42 and the permanent magnets such as 34. It will be understood that since the pull of the permanent magnets such as 34 on the armature 42 decreases rapidly with separation, the principal force to cause the armature in the fully open position to move away from the bumpers 58 will be supplied by the springs 59 supplemented by the action of gravity on armature 42. When the springs 59 have returned the armature 42 from the fully open position to a point close to the permanent magnet such as 34, the magnetic attractive force on the armature 42 will be sufficient to cause good gasket pressure between the closure member 48 and the O-ring 54.

As the magnetic pull decreases rather rapidly with the separation of the armature 42 and the magnets such as 34, the closure member 48 will pop up once it starts moving, leaving a large opening to vent the internal pressure fully.

It will be apparent from the foregoing that this invention provides an improved pressure relief device that is self-reclosing, simple in construction and operation, and free from danger in use.

While two embodiments of the invention have been illustrated, it will be obvious to those skilled in the art that it is not so limited but is susceptible to various other changes and modifications without departing from the spirit thereof. For example, the closure member 48 could be used as the piston of an air dashpot to dampen its motion, or the permanent magnets could be placed on the moving part of the invention rather than being mounted in a stationary position.

We claim as our invention:

1. A self-reclosing pressure relief device for relieving the pressure in a sealed container upon the build-up of pressure within said container to a predetermined value, said container having an aperture therein, said relief device comprising a sealing member positioned superjacent to the upper edges of the aperture in said container, said sealing member having a permanently magnetic material homogeneously distributed throughout said sealing member, a ferromagnetic closure movably mounted above the aperture, spring means cooperating with said closure member to assist in holding said closure member against said sealing means until a predetermined pressure is reached in said container so that said closure member opens when the pressure in said container reaches said predetermined value to relieve said pressure and recloses upon relief of the pressure in the container to reseal the aperture in said container.

2. A self-reclosing pressure relief device for relieving the pressure in a sealed container upon the build-up of pressure within said container to a predetermined value, said container having an aperture therein, said relief device comprising a sealing member positioned around the top of the aperture in said container, a closure member movably mounted above the aperture, permanent magnet means cooperating with spring means to hold said closure member against said sealing means until a predetermined pressure is reached in said container, ferromagnetic means to concentrate the magnetic flux of said permanent magnet means, said closure member opening against the combined forces of the magnetic means and the spring means when the pressure in said container reaches said predetermined value to relieve said pressure, said closure member reclosing upon relief of the pressure in the container to reclose the aperture in said container, and means to adjust the pressure on the sealing member by varying the spacing between the permanent magnet means and the closure member.

3. A self-reclosing pressure relief device for relieving the pressure in a sealed transformer upon the build-up of pressure within said transformer to a predetermined value, said transformer having an aperture therein, said relief device comprising a sealing member positioned around the periphery of the top of the aperture in said container, a movably mounted closure member in register with said sealing member, a ferromagnetic armature adjustably mounted on said closure member, magnetic means mounted about the aperture, said magnetic means cooperating magnetically with said ferromagnetic armature to hold the closure member against said sealing member until a predetermined pressure is reached in said container, ferromagnetic pole pieces in contact with said magnet means to concentrate the magnetic flux of said magnet means and increase the number of points of magnetic contact between the armature and the magnetic means, said closure member opening against the force of the magnetic means when the pressure in said container reaches said predetermined value to relieve such pressure, spring means to return said closure member to said sealing member, said closure member reclosing upon the release of the pressure in the container to reseal the aperture in said transformer, and means to adjust the pressure between the closure member and the sealing member by varying the spacing between the magnet means and the ferromagnetic armature.

4. In a pressure relief device the combination of a movably mounted closure member which opens with upward motion, stationary valve seating means registering with said closure member, said stationary valve seating means located subadjacent said closure member, ferromagnetic armature means adjustably mounted on said closure member, magnetic means mounted near the periphery of said valve seating means, said armature means being capable of being so adjusted as to contact said magnetic means, said magnetic means registering with said armature means, said magnetic means comprising a plurality of permanent magnets with associated pole pieces to concentrate magnetic flux and increase the number of magnetic contacts between the magnetic means and the armature, guide means to control the motion of the closure member when said closure member and attached armature are opened by being forced upward away from the influence of the magnetic means by a predetermined pressure, and means to return said closure member to said valve seating means.

References Cited by the Examiner

UNITED STATES PATENTS

| 1,549,665 | 8/25 | Hill et al. | 174—11 X |
| 2,575,906 | 11/51 | Bullard | 251—65 X |
| 2,708,944 | 5/55 | Modine | 251—65 X |
| 2,774,375 | 12/56 | Bernat et al. | 251—65 X |
| 3,024,392 | 3/62 | Baermann | 317—159 |

FOREIGN PATENTS 703,831  2/54  Great Britain.

JOHN F. BURNS, *Primary Examiner.*

DARRELL L. CLAY, E. JAMES SAX, *Examiners.*